Patented Feb. 18, 1936

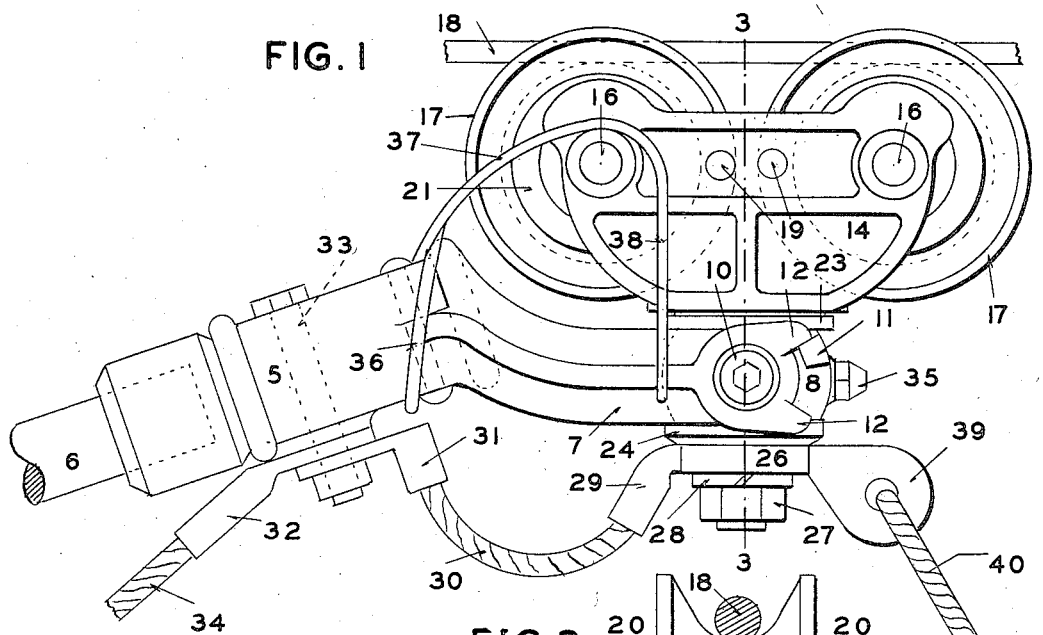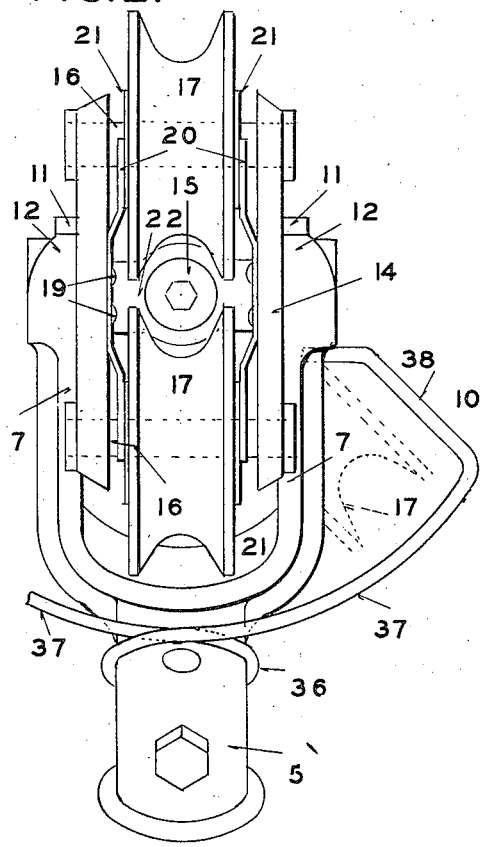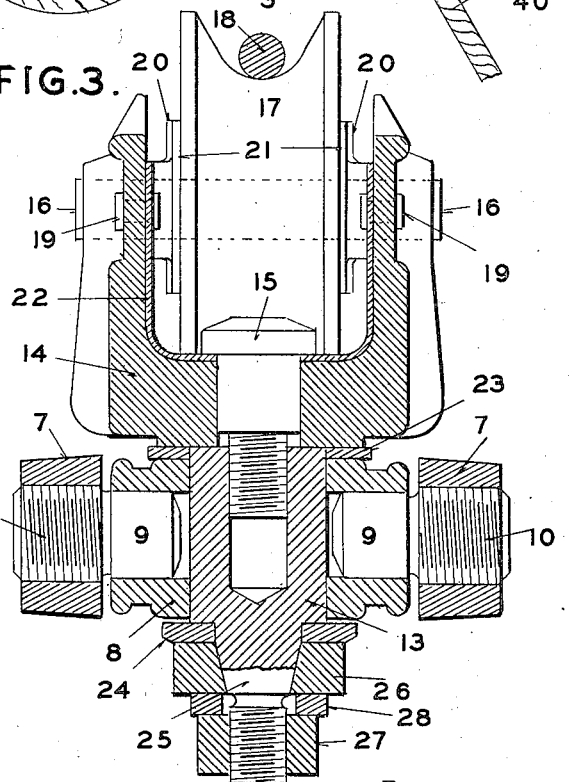

2,031,081

UNITED STATES PATENT OFFICE 2,031,081

ELECTRIC CURRENT COLLECTOR

Albert Vigne, Webster Groves, Mo., assignor to National Bearing Metals Corporation, St. Louis, Mo., a corporation of New York Application August 10, 1934, Serial No. 739,192

4 Claims. (Cl. 191—63.3)

My invention relates to an electric current collector and particularly to that type of collector used on electrically propelled vehicles which do not travel upon rails and hence are subject to considerable lateral movement with respect to the trolley wire from which the operating current is collected.

One object of my invention is to provide a tandem wheel current collector which will permit of the necessary lateral movement of the vehicle relative to the trolley wire.

Another object of my invention is to improve the conductivity of current collectors of this type.

Still another object of my invention is to provide means for preventing the fouling of the trolley wire or its supports between the harp and the collector wheels.

A further object of my invention is to provide means for alignment of the collector wheels with the trolley wire when said wheels are returned to the wire after displacement.

In the accompanying drawing, which illustrates one form of current collector made in accordance with my invention, Figure 1 is a side elevation; Figure 2 is a top plan view; and Figure 3 is an enlarged section taken on the line 3—3 of Figure 1.

The harp indicated by the numeral 5 is mounted on the end of the usual trolley pole 6. Situated between the bifurcated ends 7 of the harp is a pivot block 8 engaged by a pair of trunnions 9 carried on plugs 10 threaded in the arms 7. This method of mounting the block 8 permits of its movement on a horizontal axis. This movement is limited by a pair of stops 11 on the block, each of which stops is adapted to engage with a pair of stops 12 on the adjacent arm 7.

Formed in the block 8 is a vertical opening for the reception of a pivot pin 13, to the upper end of which a truck 14 is rigidly secured by a bolt 15. Mounted in the truck upon axles 16 are a pair of tandem trolley wheels 17 adapted to engage with the trolley wire 18. As it is not desirable to conduct the current from the trolley wire through the axles of the wheels, I secure to each side of the truck, by means of rivets 19, a spring 20 of good conducting material. The ends of each of these springs bear either directly against the sides of the wheels or against washers 21 of conducting material interposed between the sides of the wheels and the springs. The two springs 20 are connected by a U-shaped member 22 of conducting material, preferably integral with the springs, which extends under the head of the bolt 15 so as to be held firmly in contact with the truck.

Situated between the truck and the block 8 is a washer 23 and another washer 24 is placed on the lower end of the pin 13, the latter washer seating against a shoulder on the pin to prevent binding of the block. The portion of the pin below the washer is provided with a taper 25 fitting in a correspondingly tapered opening in a yoke 26. The yoke 26 is held rigidly in position by means of a nut 27 on the threaded lower end of the pin. A lock washer 28 is preferably placed between the yoke and the nut. One end of the yoke is provided with a terminal 29 connected by a flexible conductor 30 with a terminal 31. This terminal is held in contact with a terminal 32 by a bolt 33 passing through the stem of the trolley harp. Leading from the terminal 32 to the vehicle is the usual conductor 34. To lubricate the pin 13 the block 8 may be provided with a grease nozzle 35.

To prevent the trolley wire 18 or its supporting wires (not shown) from entering between the harp and the wheels when the latter are at an angle to the harp, as shown in dotted lines in Figure 2, I provide a guard. This guard is preferably formed of heavy wire and comprises a loop portion 36 surrounding the shank of the harp, a pair of outwardly and upwardly extending extensions 37, and a pair of downwardly and inwardly extending ends 38, the latter preferably engaging the arms 7 of the harp.

Owing to the swing of the truck on its vertical pivot there is difficulty in aligning the wheels with the trolley wire when replacing the wheels on the wire unless some means is provided for controlling the position of the truck. To accomplish this I provide the yoke with an offset eye 39 to which the trolley rope is attached. Due to this arrangement, if the trolley rope is held in the plane of the trolley wire, the wheels will be aligned with the wire regardless of the position of the harp therewith.

Having fully described my invention, what I claim as new and desire to secure by Letters Patent of the United States is:

1. In a device of the class described, the combination with a truck, of collector wheels mounted therein, a vertical pivot pin carrying said truck, a pivot block in which said pivot pin is mounted, and a trolley harp provided with trunnions engaging said pivot block.

2. In a device of the class described, the combination with a truck, of collector wheels mounted therein, a vertical pivot pin carrying said truck, a pivot block in which said pivot pin is mounted, a trolley harp provided with trunnions engaging said pivot block, and an offset member carried by said pin and secured to a trolley rope.

3. In a device of the class described, the combination with a truck, of collector wheels mounted therein, a vertical pivot pin, a bolt securing said truck to said pin, a pivot block in which said pin is mounted, a trolley harp, and trunnions carried by said harp and engaging said block.

4. In a device of the class described, the combination with a truck, of collector wheels mounted therein, a trolley harp carrying said truck, said truck having pivotal movement relative to said harp on a vertical axis, a guard for preventing entrance of a trolley wire between the harp and the truck, said guard comprising a loop portion surrounding the shank of the harp, a pair of upwardly and outwardly projecting extensions, and a pair of downwardly and inwardly extending ends.

ALBERT VIGNE.